US005635003A

United States Patent [19]
Phelps

[11] Patent Number: 5,635,003
[45] Date of Patent: Jun. 3, 1997

[54] COLD SEALING PROCESS FOR SOFT TRIM PRODUCTS

[75] Inventor: Richard A. Phelps, Ferndale, Mich.

[73] Assignee: Chivas Products, Limited, Sterling Heights, Mich.

[21] Appl. No.: 364,555

[22] Filed: Dec. 27, 1994

[51] Int. Cl.$^6$ .................................................. B32B 31/20
[52] U.S. Cl. .................. 156/222; 156/245; 156/272.2; 156/295; 156/306.6; 156/322; 156/309.6
[58] Field of Search ............................ 156/228, 222, 156/322, 306.6, 309.9, 272.2, 245, 273.3, 273.5, 273.7, 295, 309.6; 264/322

[56] References Cited

U.S. PATENT DOCUMENTS

| | | | |
|---|---|---|---|
| 3,234,064 | 2/1966 | Smith | 156/222 |
| 3,621,092 | 11/1971 | Hofer | 264/322 |
| 3,850,723 | 11/1974 | Ackley | 156/228 |
| 3,935,358 | 1/1976 | Wyeth et al. | 156/245 |
| 4,181,551 | 1/1980 | Ward | 156/222 |
| 4,595,551 | 6/1986 | Maurer | 264/257 |
| 4,695,501 | 9/1987 | Robinson | 428/159 |
| 4,698,252 | 10/1987 | Koch et al. | 156/222 |
| 4,728,566 | 3/1988 | Lancaster et al. | 156/272.2 |
| 5,254,197 | 10/1993 | Klems . | |
| 5,286,325 | 2/1994 | Miyota et al. . | |
| 5,302,447 | 4/1994 | Ogata et al. . | |
| 5,312,848 | 5/1994 | Klapper et al. | 264/46.4 |

FOREIGN PATENT DOCUMENTS 132061  8/1978  Germany .................. 156/228

Primary Examiner—Geoffrey L. Knable
Attorney, Agent, or Firm—Harness, Dickey & Pierce, PLC

[57] ABSTRACT

To form a prebonded composite structure, a laminate composite is prepared by positioning a first layer of heat-activated adhesive between a first fabric layer and a second side of a pad and a second fabric layer is positioned adjacent a second side of the pad. The laminate composite is heated to produce a heated laminate composite and the heated laminate composite is positioned between an upper mold and a lower mold. The laminate composite is compressed between the upper and lower molds, thereby compressing the first layer of heat-activated adhesive between the pad and the first fabric layer. In one application, dielectric heat is applied to the laminate composite during the step of compressing the laminate composite.

17 Claims, 4 Drawing Sheets

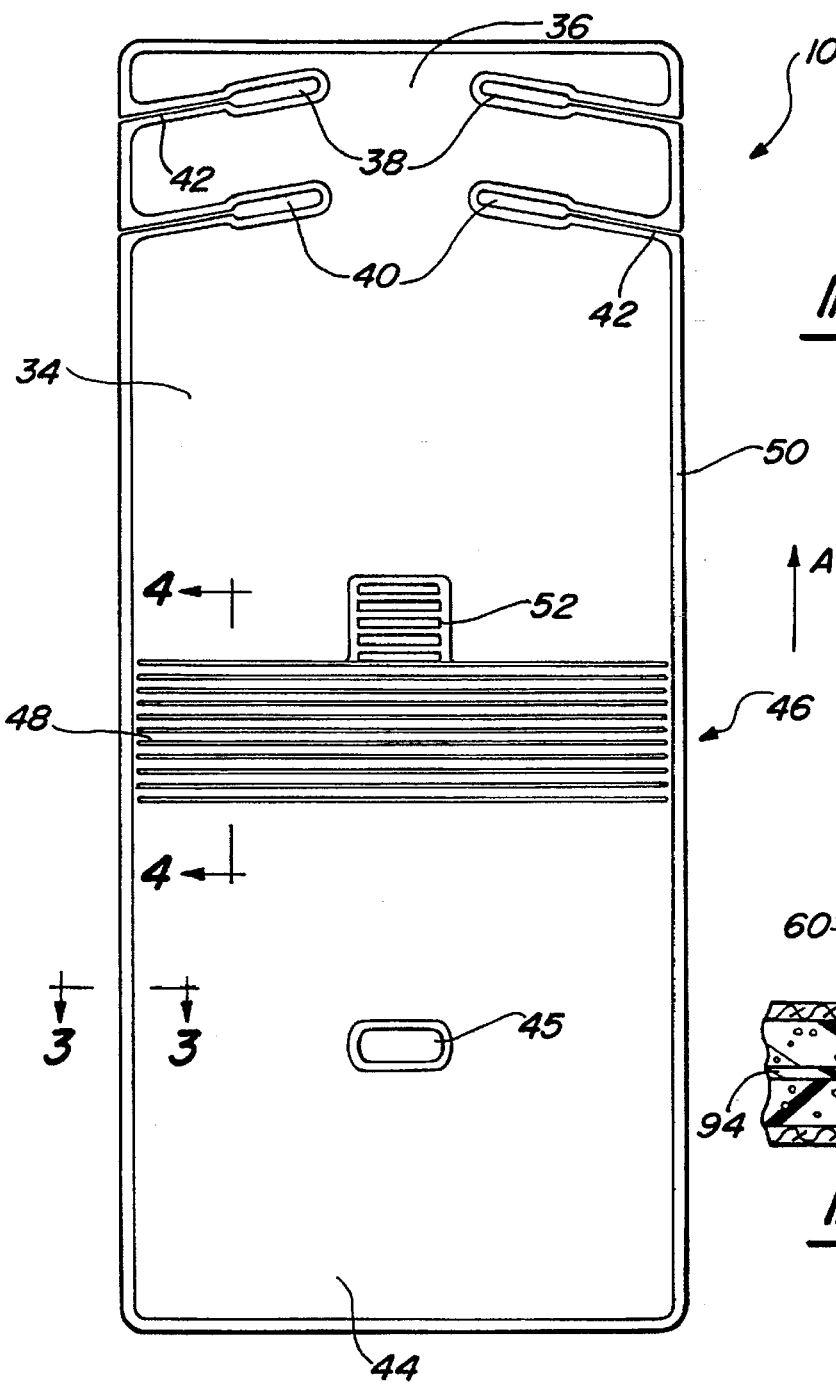

COLD SEALING PROCESS FOR SOFT TRIM PRODUCTS

TECHNICAL FIELD

The subject invention relates, in general, to soft trim products and a cold sealing process for manufacturing soft trim products. More particularly, the present invention relates to an improved soft trim product and method of manufacturing soft trim products in which a composite laminate is heated and subsequently compressed using a relatively cool die to effectuate an adhesive bond.

BACKGROUND OF THE INVENTION

Heretofore, various techniques have been developed to eliminate the costly and labor intensive cut and sew methods of joining two or more layers of sheet-like material, such as cloth, fabric or the like. One known technique employs contact adhesive which is applied to one of the layers of material to form an adhesive bond therebetween. However, once the adhesive is applied it is difficult to position the layers of material relative to one another without a degree of misalignment. Furthermore, the resulting product is often flawed with undesirable wrinkles.

It is also known to apply dielectric heating to a heat-sensitive material placed between two materials to effectuate bonding therebetween. While dielectric heating has proven to be satisfactory for bonding materials including a closed-cell structure, such as vinyl and the like, difficulties are encounter when one or both of the materials to be bonded have an open-cell structure, such as fabric. The high energy electric environment necessary to sufficiently actuate typical heat-sensitive adhesives is susceptible to arcing when used in connection with porous materials.

Another known technique, commonly referred to as "hot sealing", includes disposing a heat-sensitive adhesive sheet or film between two portions of fabric and melting the adhesive to effectuate bonding with a heated pressing mold in contact with the fabric. Disadvantageously, this technique often results in nonuniform bonding due to uneven temperature distribution throughout the layer of adhesive. Additionally disadvantageous, many fabric types which are otherwise well suited for soft trim products are made from materials which cannot withstand the high temperature ranges necessary to sufficiently activate the adhesive and join the fabrics. As a result, these otherwise desirable materials are rendered unusable. In this regard, the integrity of the strength of a fabric and other physical properties are often susceptible to degradation when exposed to the high temperatures necessary to effectuate proper bonding. For example, many fabrics are subject to color changes when exposed to mold temperatures in excess of 260° F. Furthermore, a heated tool or press that is utilized to melt heat-sensitive adhesive between layers of fabric is generally removed from the material while the adhesive is in at least a partial liquid state. As a result, the materials intended for bonding are subject to separation prior to complete setting of the adhesive.

While previously known techniques have proven to be relatively commercially acceptable for a wide range of applications, each is attendant with inherit limitations, some of which have been discussed above. In addition, many prior techniques are complex, cost prohibitive, or both.

Accordingly, it is desired to provide a cost effective method of manufacturing a soft trim product that is applicable for use with a wide range of materials.

SUMMARY OF THE INVENTION AND ADVANTAGES

In one aspect, the present invention provides a method of manufacturing a prebonded composite structure. The method includes the step of preparing a laminate composite. The laminate composite is prepared by positioning a first layer of heat-activated adhesive between a first fabric layer and a first side of a pad, and positioning a second fabric layer adjacent the second side of the pad. Next, the laminate composite is heated to produce a heated laminate that is positioned between an upper mold and a lower mold. Finally, the first layer of heat-activated adhesive is compressed between the pad and the first fabric layer.

In another aspect, the present invention provides a prebonded composite structure. The prebonded composite structure is produced by a process including the step of first preparing a laminate composite. The laminate composite is prepared by positioning a first layer of heat-activated adhesive between a first fabric layer and a first side of a pad, and positioning a second fabric layer adjacent a second side of the pad. The laminate composite is heated to produce a heated laminate composite. Subsequently, the heated laminate composite is positioned between an upper mold and a lower mold. Finally, the first layer of heat-activated adhesive is compressed between the pad and the first fabric layer.

The advantages of the subject invention include a non-complex, cost-efficient soft trim product and method of manufacturing soft trim products.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a front plan view of the seat insert unit of FIG. 1;

FIG. 7 is a partial cross-sectional view illustrating the laminate composite of FIG. 6 compressed between a lower mold and an upper mold;

FIG. 9 is a cross-sectional view of an alternative construction of a laminate composite.

DETAILED DESCRIPTION OF THE PREFERRED EMBODIMENTS

Figure 1:
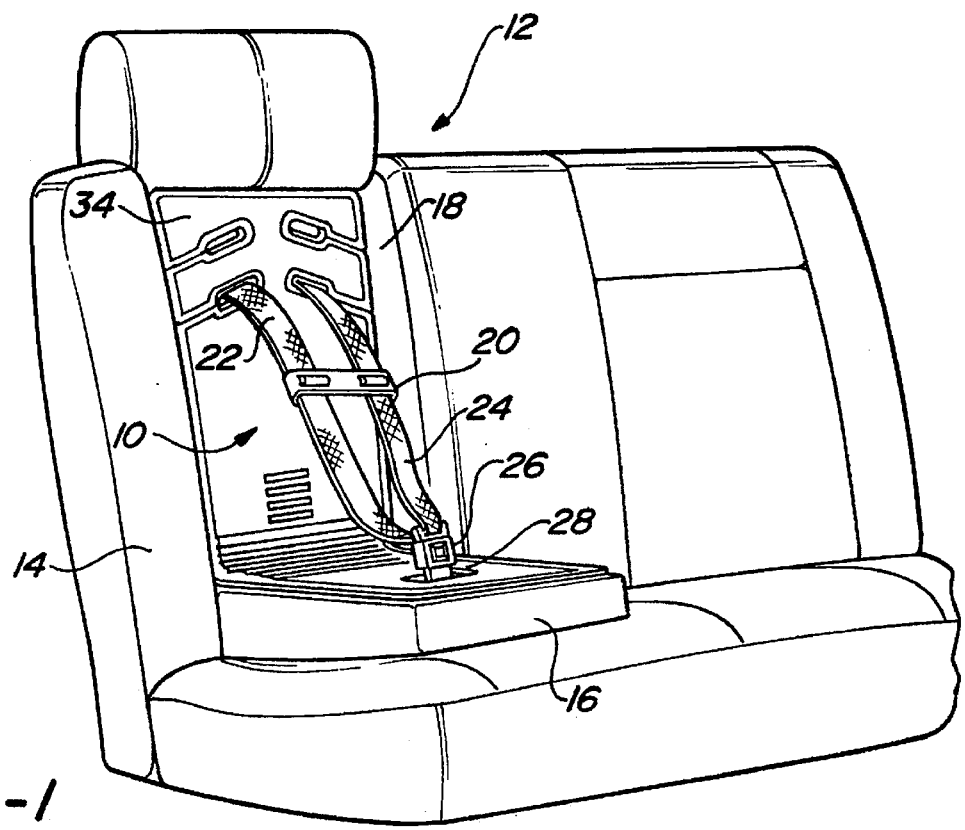
FIG. 1 is a perspective view of an exemplary embodiment of an apparatus constructed in accordance with the teachings of a preferred embodiment of the present invention, the exemplary embodiment of the apparatus comprising a seat insert unit, the seat insert unit shown operatively attached to an integrated child car seat.

Certain terminology is used in the following detailed description for convenience only and is not intended to be limiting. For example, the words "upper" and "lower" are intended to designate direction or orientation shown in the drawings to which reference is being made. Also in the drawings, where similar reference characters designate like parts throughout several views, illustrated are preferred embodiments of the present invention. More specifically, the reference numeral 10 generally denotes an exemplary apparatus constructed in accordance with the teachings of the present invention. The exemplary apparatus is illustrated as a seat insert unit for an integrated child car seat 12. However, it will be readily understood by those skilled in the art that the illustrated application of the present invention is merely illustrative exemplary and could be employed in other applications where it is advantageous to utilize a pre-bonded composite structure for lay up purposes.

Figure 3:
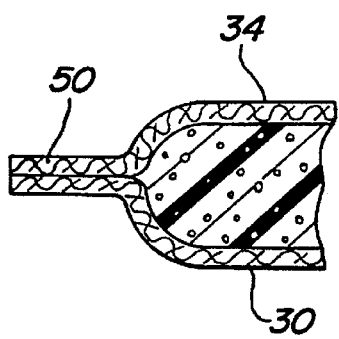
FIG. 3 is a cross-sectional view taken through the line 3—3 of FIG. 2.
Figure 4:
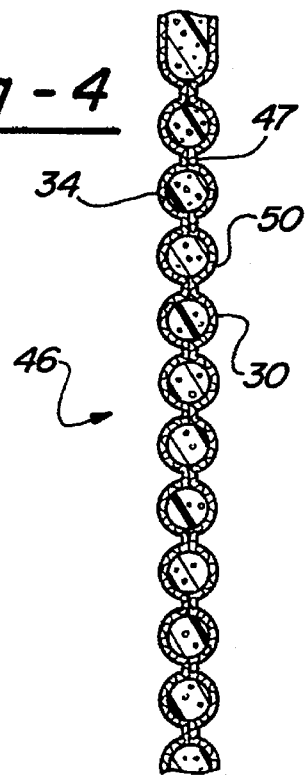
FIG. 4 is a cross-sectional view taken through the line 4—4 of FIG. 2.

The subject invention generally relates to an apparatus and a method for bonding a fabric or similar material to a pad or foam cushion using a heat-activated adhesive. Turning now to FIGS. 1–3, illustrated is a series of views of the child seat insert unit 10 of the present invention. More particularly, FIG. 1 shows the seat insert unit 10 operatively attached to an integrated child car seat 12, FIG. 2 shows a front plan view of the seat insert unit 10, and FIGS. 3 and 4 show partial cross-sectional views of the seat insert unit 10 taken through line 3—3 and line 4—4 of FIG. 2, respectively.

The integrated child car seat 12, which is shown in FIG. 1 operatively arranged with the seat insert unit 10, is of conventional construction and is adapted for concealed storage within an adjacent vehicle seat 14 when not in use. However, it will be appreciated by those skilled in the art, that the seat insert unit 10 of the present invention is equally applicable for a conventional, non-integrated child car seat (not shown) and other seats, including but not limited to high chairs and the like, where it is advantageous to incorporate a removable seat insert unit. In a broader sense, the teachings of the present invention, which are illustrated through the seat insert unit 10, are applicable to a significantly more broad range of applications.

The illustrated integrated child car seat 12 includes a seat portion 16 and a back portion 18. The integrated child seat 12 further includes a restraint harness 20 having a pair of shoulder belts 22, 24, and a buckle member 26. A latch member 28 is attached to the seat portion 16 to which the buckle member 26 of the harness 20 is adapted to releasably engage. For purposes of strength, exterior surfaces of the seat portion 16 and back portion 18 of the child seat 12 are generally constructed of non-deformable plastic or other suitable rigid material. It will be readily recognized that the construction of typical child seats, including the integrated child seat 12 shown in FIG. 1, require padding for occupant comfort.

As is known by those skilled in the art, a fastening material (not shown) is attached to the exterior surfaces of the seat portion 16 as well as the back portion 18 of the integrated child seat 12. The fastening material is either a hooked or looped material, both of which are commercially sold together under the trademark Velcro. In the illustrated embodiment, the material attached the seat portion 16 and the back portion 18 is the hooked material. As will be appreciated by those skilled in the art, the hooked and looped materials are capable of releasable attachment to one another.

The seat insert unit 10 includes a rear surface 30 adapted to be disposed adjacent the integrated child car seat 12 and a front surface 34 upon which a child occupant is to be directly supported. Substantially adjacent an upper end 36, the seat insert unit 10 further includes upper and lower horizontally arranged pairs of apertures 38, 40. Each of the apertures of both pairs of apertures 38, 40 is adapted to receive one of the shoulder belts 22, 24 of the restraint harness 20. The pairs of apertures 38, 40 can be selectively chosen for use depending upon the size of the child occupant to be restrained by the seat 12. To provide access to the apertures 38, 40, the seat insert unit 10 is formed to include slots 42 which extend from each of the apertures 38, 40 to the perimeter of the seat insert unit 10 through which one of the shoulder belts 22, 24 may pass. Adjacent a lower end 44, the seat insert unit 10 is additionally formed to include an aperture 45 which permits access for the buckle member 26 of the restraint harness 20 to releasably engage the latch member 28 of the seat portion 16.

In the preferred embodiment, the seat insert 10 of the present invention is formed to include a centrally located ribbed portion 46. A primary area 48 of the centrally located ribbed area 46 includes a plurality of individual ribs 50 which laterally extend across substantially the entire width of the seat insert unit 10. The laterally extending ribs 50 serve the dual purposes of facilitating longitudinal flexing of the seat insert unit 10 and maintaining the positioning of central portions of the front and rear surfaces 34, 30 relative to one another. In the exemplary embodiment, the seat insert unit 10 also includes a secondary area 52 of ribs. The secondary area 52 cooperates with the primary area 48 to further maintain the central portions of the front and rear surfaces 34, 30 relative to one another. A pinch seal area 50 peripherally surrounds the seat insert unit 10 as well as each aperture of the pairs of apertures 38, 40, the respective slots 42, and the aperture 45.

In one application, the seat insert unit 10 is approximately 13 inches in width and 30 inches length and is substantially symmetrical about a longitudinal centerline. The thickness of the seat insert unit is approximately ⅝ inch to ¾ inch. In the exemplary embodiment illustrated, the nap of the fabric is in a direction indicated by arrow A shown in FIG. 2. It will be appreciated by those skilled in the art that the dimensions provided are merely illustrative of a single application. In this regard, the dimensions can be readily modified for particular applications.

Figure 6:
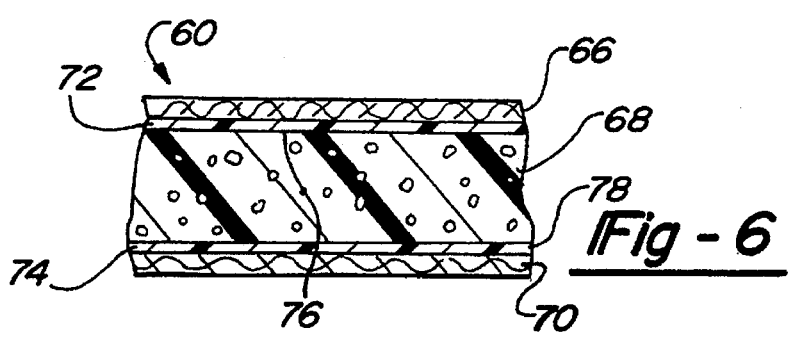
FIG. 6 is a cross-sectional view of a laminate composite utilized in manufacturing the apparatus of the first embodiment of the present invention.
Figure 5:
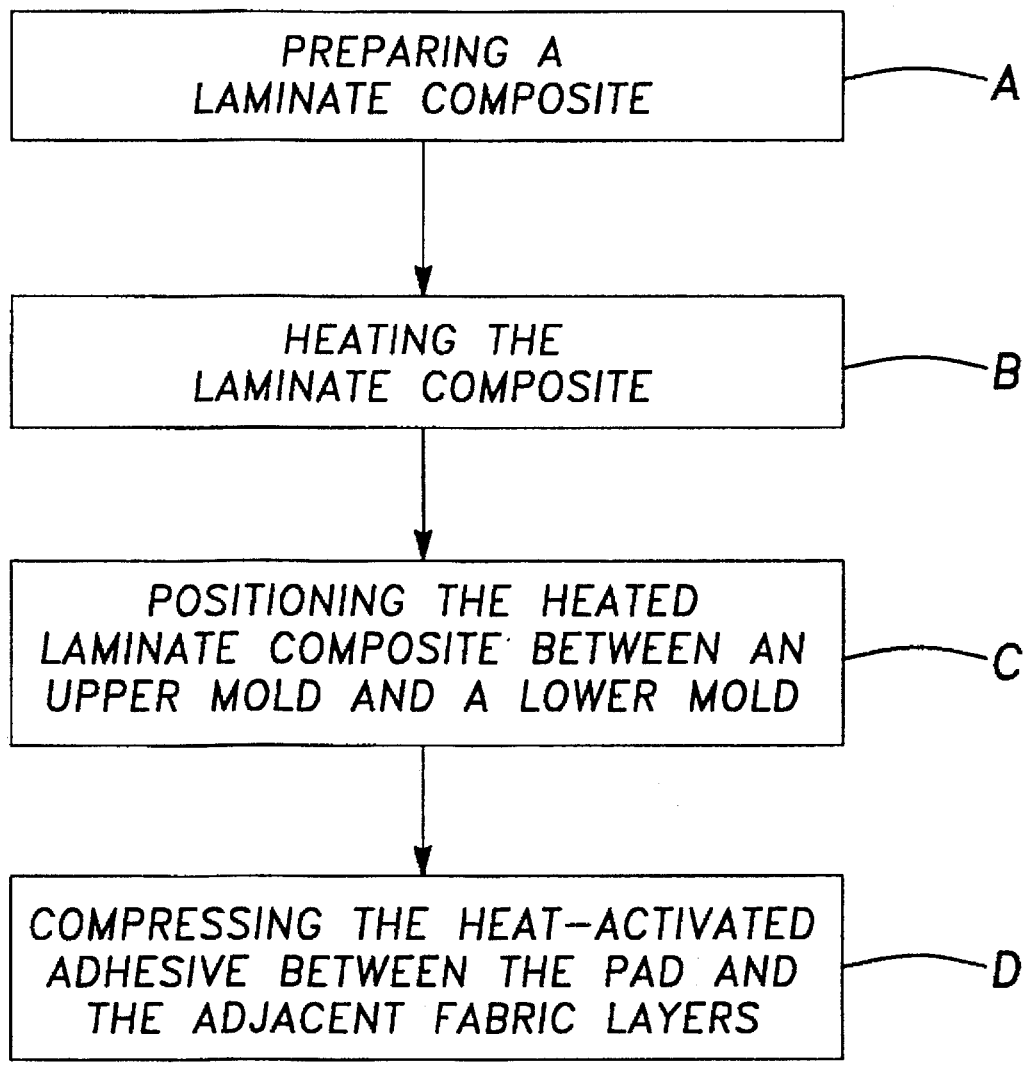
FIG. 5 indicates the general steps of a first preferred method for forming a composite products according to this invention.

With additional reference to FIGS. 5–7, a first preferred method of the present invention will now be described in detail. FIG. 5 indicates the general steps of the first preferred method for forming composite products according to this invention. FIG. 6 is a cross-sectional view of a laminate composite 60 utilized in manufacturing the seat insert unit 10. FIG. 7 is a partial cross-sectional view of upper and lower molds 62, 64 used in conjunction with the first preferred method.

The first preferred method of the present invention begins by preparing the laminate composite 60. As illustrated in FIG. 6, the laminate composite 60 includes a first or upper layer of fabric 66, a pad 68, and a second, or lower, layer of fabric 70. Further, the laminate composite 60 preferably includes first and second layers of heat-activated adhesives 72, 74. The first layer of heat-activated adhesive is interdisposed between a first side 76 of the pad 68 and the first layer of fabric 66. The second layer of the heat-activated adhesive 74 is disposed between a second side 78 of the pad 68 and the second layer of fabric 70.

In the preferred embodiment, the first layer of fabric 66 is a polymeric fabric such as exemplified by nylon, polypropylene and wool/cotton. The second layer of fabric 70 is preferably a hooked or looped material chosen such that the second layer is capable with the material attached to the integrated child seat 12 for releasable attachment. In the exemplary embodiment illustrated, the second layer of fabric 70 is a looped material. It will be appreciated by those skilled in the art that alternative manners of releasably attaching the seat insert unit 10 to the child seat 12 may be utilized within the scope of the present invention. For example, buttons, snaps or other fasteners can be used in lieu of hooked and looped material.

The pad 68 is a foam pad approximately 0.25 to 0.75 inch thick. In the preferred embodiment, a pad of uniform thickness is roll-feeded between the first and second layers of fabric 66, 70. However, it will be appreciated by those skilled in the art, that the pad 68 may be precut to a desired size and precontoured for the particular application. In this regard, the pad 68 can be preformed to include apertures (not shown) corresponding in size and location to the pairs of horizontal apertures 38, 40 and the aperture 45. It also may be desirable to provide a pad of varying thickness. In the exemplary embodiment, the pad 68 has a thickness approximately 0.75 inch in areas intended to directly support the child occupant such as between the ribbed portion 46 and the aperture 45 and between the ribbed portion 46 and the pairs of horizontal apertures 38, 40. Less padding is needed adjacent the upper and lower ends 36, 44 of the seat insert unit 10 and through the ribbed portion 46. In these areas the pad is approximately 0.35 inch thick. Alternatively, the foam pad can be substituted by a non-woven polyester padding or any of a number of suitable known materials.

The first and second layers of heat-activated adhesive 72, 74 are preferably sheets of thermoplastic material which are non-tacky at room temperature. One suitable material is commercially available from Dry Adhesive Technologies (DAT) as Part No. VI 6010. Alternatively, the surfaces of the first and second fabric layers 66, 70 adjacent the foam pad can be roll-coated with a suitable heat-activated adhesive which is ordinarily non-tacky in use. Although known to those skilled in the art, suitable adhesives include Product No. HC 7675, available from PPG, Hughes Chemical Division, and Product No. 2895, available from Worthen, Upaco Adhesive Division.

Preparation of the laminate composite 60 is completed by pre-cutting the materials (e.g., the first and second fabric layers 66, 70 and the first and second layers of heat-activated adhesive 72, 74) into a desired shape. For the seat insert unit 10 of the present invention, the laminate composite 60 is generally rectangular in geometry. The length and width of the laminate composite 60 are each approximately 0.5 to 1.0 inch greater than corresponding dimensions of the finished seat insert unit 10.

In accordance with the next step of the preferred method of the present invention, the laminate composite 60 is heated. In one application, the laminate composite 60 is heated to a target temperature at least 250° F. and is preferably heated to a temperature of between approximately 300°–350° F. In the preferred method, the temperature is slowly uniformly raised from room temperature to the target temperature range of 300°–350°. By slowly raising the temperature of the laminate composite 60, shock to the materials is minimized and the first and second layers of heat-activated adhesive 72, 74 are uniformly heated. Further in the preferred method, the increase of the temperature is accomplished in multiple staged ovens (not shown). The ovens may be infrared ovens or convection ovens, or a combination of both. In one application, a series of three (3) ovens is utilized to heat the composite laminate 60. With infrared ovens, each stage of heating is approximately 15–20 seconds in length. It will be appreciated by those skilled in the art that a slightly shorter duration is necessary with convection ovens. It will also be appreciated that the target temperature is primarily dictated by the material chosen as adhesive and, therefore, the target temperature range may be adjusted upward or downward. Importantly, at the target temperature range the first and second layers of heat-activated adhesive 72, 74 are soft and tacky to the touch. Preferably, the laminate composite 60 is maintained at substantially atmospheric pressure throughout the heating cycle.

The next step of the preferred method of the present invention comprises positioning the heated laminate composite 60 between the upper mold 62 and the lower mold 64. While not shown in detail, it will be appreciated by those skilled in the art that at least one of the upper and lower molds 62, 64 includes a contoured mold surface (not shown in detail). In this regard, one of the molds 62, 64 is formed to include seal bars 80 or trim bars adapted to form the pinch seal area 50 surrounding the seat insert unit 10, the apertures 38, 40 along with their corresponding slots 42, the ribbed area 46 and the aperture 45. It will further be appreciated by those skilled in the art, that the incorporation of trim bars will reduce the final trimming necessary to complete the seat insert unit 10.

As shown in FIG. 7, the upper mold 62 used in the preferred method of the present invention integrally incorporates a contoured mold surface formed to include appropriate die bars 80. Alternatively, the die bars 80 can be removably attached to one or both of the molds 62, 64. In the exemplary embodiment illustrated, the lower mold 64 is a substantially flat plate. As further shown in FIG. 7, the composite laminate 60 is placed between the upper and lower molds 62, 64 with the rear surface 30 of the seat insert unit 10 adjacent contoured mold surface of the upper mold 62. Such positioning of the composite laminate 60 results in improved definition and bond lines for the front surface 34 of the seat insert unit 10.

The next step of the preferred method of the present invention comprises compressing the heat-activated adhesive layers 72, 74 between the pad 68 and the adjacent fabric layers 66, 70. In the first preferred method, the upper and lower molds 66, 70 are maintained at approximately room temperature throughout compression of the seat insert unit 10. The upper and lower molds 62, 64 are operatively arranged with a suitable power source (not shown), such as a motor, for controlling the vertical movement of one of the molds with respect to the other. The upper mold 62 is moved downwardly, compressing the foam pad 68 against each of the layers of adhesive 74, 76, the layers of fabric 66, 70 and ultimately the lower mold 64 into a compressed condition as schematically illustrated in FIG. 7.

Compression between the molds 62, 64 is maintained until the adhesive is permitted to sufficiently cool, thereby bonding the fabric layers 66, 70 to the foam pad 68. Once the adhesive is cured, the upper mold 62 is raised and the seat insert unit 10 is removed. In the exemplary application described herein, a sufficient bond between the pad 68 and the first and second layers of fabrics 66, 70 is effectuated while maintaining the molds 62, 64 at approximately room temperature in approximately ten (10) seconds. In the exemplary application described herein, a force of between approximately 1500 lb/in$^2$ and 2,500 lb/in$^2$ and preferably approximately 2,000 lb/in$^2$ is utilized to sufficiently compress the laminate composite 60. It will be appreciated by those skilled in the art that the compression cycle of the preferred method will be longer in duration if one or both of the molds 62, 64 is maintained above room temperature. It will also be appreciated by those skilled in the art that the force necessary to effectuate a sufficient bond will vary depending on the temperature of the composite laminate 60 and the temperature of the upper and lower molds 62, 64.

While the composite laminate 60 shown in FIG. 6 is illustrated to include first and second layers of adhesive 72, 74, alternatively the composite laminate 60 can be constructed to include a single layer of adhesive. For example, one of the first and second layers of adhesive 72, 74 can be omitted if the pad material selected for the seat insert unit 10 is sufficiently porous to permit a bond to effectuate between the single layer of adhesive and the fabric layer on the opposite side of the pad 68.

Figure 8:
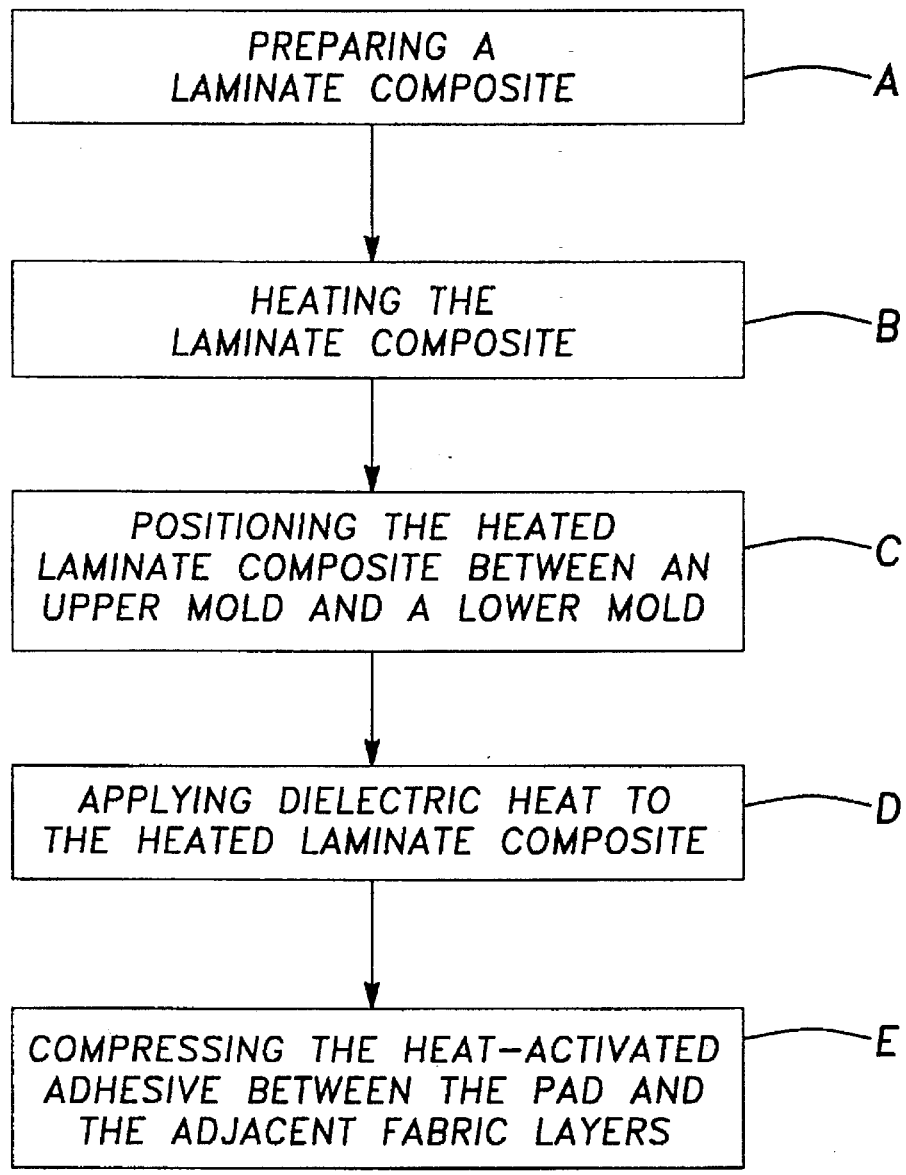
FIG. 8 indicates the general steps of a second preferred method for forming a composite products according to the present invention.

With reference to FIG. 8, a second preferred method of the present invention will now be described. The second preferred method of the present invention includes the steps of: (A) preparing a laminate composite 60; (B) heating the laminate composite 60; and (C) positioning the heated laminate composite 60 between the upper mold 62 and lower mold 64. These first three steps of the second preferred embodiment are substantially identical to corresponding steps of the first preferred embodiment and need not be again described in detail.

The next step of the second preferred method of the present invention involves the application of dielectric heat to the heated laminate composite 60. The elevated temperature of the heated laminate composite 60 allows a low energy level of dielectric heat to be used to further effectuate the bond between the pad 68 and the adjacent layers of fabric 66, 70. The lower energy level of dielectric heat may be utilized with significantly less occurrence of arcing often associated with the application of dielectric heat to porous material such as fabric or foam padding. The application of dielectric heat decreases the time necessary for bonding and increases the materials available for selection.

The second preferred method of the present invention next includes the step of compressing the composite laminate 60 between the upper and lower molds 62, 64. This step is substantially identical to the corresponding step of the first preferred method and need not be described again in detail. Briefly, as discussed above, the compression time may be slightly less in the second preferred embodiment due to the application of the dielectric heat.

The first and second preferred methods have been described so as to utilize the upper and lower molds 62, 64 while they are maintained at substantially room temperature. Alternative to each of these preferred methods, one or both of the molds 62, 64 can be operated at elevated temperatures. In one application, each of the molds 62, 64 is maintained at a temperature of approximately 150° F. to 175° F. The elevated temperature of the molds 62, 64 serves to better define the definition and bond lines of the seat insert unit 10. It will be appreciated by those skilled in the art that if increased mold temperatures are utilized, additional time will be required for the adhesive to sufficiently cool so as effectuate a bond between the pad 68 and the first and second fabric layers 66, 70.

Turning to FIG. 9, an alternative construction of a composite laminate 60' is illustrated. Equivalent structure between the composite laminate 60 and the composite laminate 60' are represented as prime numbers in FIG. 9. The alternative laminate composite 60' is preferably constructed by flame laminating a first pad 90 to the first layer of fabric 66' and a second pad 92 to the second layer of fabric 70'. Preferably, the first and second pads 90, 92 are formed from urethane-type foam which is suitable for flame laminating.

The process of flame laminating is well known to those skilled in the art and need not be described in detail. Briefly, the foam pads 90, 92 are heated with a flame until the surface begins to melt and become tacky. While in a tacky state, the first and second layers of fabric 66', 70' are attached to the respective pads 90, 92. A layer of adhesive 94 is positioned between the first and second pads 90, 92. Thus, as shown in FIG. 9, the composite laminate includes from top to bottom the first fabric layer 66', the first pad 90, the layer of heat-activated adhesive 94, the second pad 92 and the second layer of fabric 70'. Subsequently, the alternative composite laminate 60' can be utilized in connection with either the steps described for the first preferred method or the steps of the second preferred method.

With each of the above methods, it will be understood by those skilled in the art that the temperature cycles and the amount of pressure applied to the laminated composite may be varied. In this regard, if the laminate composite 60 is preheated to a lower temperature, more pressure may be required to effectuate a sufficient bond between the materials. Analogously, if additional heat is applied to the laminate composite 60, less pressure will be required.

The foregoing discussion discloses and describes merely exemplary applications of the teachings of the present invention. One skilled in the art will readily recognize from such discussion, and from the accompanying drawings and claims, that various changes, modifications and variations can be made therein without departing from the spirit and scope of the invention as defined in the following claims.

What is claimed:

1. A method of manufacturing a prebonded composite structure, the method comprising the steps of:
    preparing a laminate composite, the step of preparing a laminate composite comprising the sub-steps of:
        (i) positioning a first layer of heat-activated adhesive between a first fabric layer and a first side of a pad; and
        (ii) positioning a second fabric layer adjacent a second side of the pad;
    heating the laminate composite to produce a heated laminate composite;
    bonding the pad to the first fabric layer; and
    bonding the pad to the second fabric layer by permitting flow of the first layer of heat-activated adhesive through the pad.

2. The method of claim 1, wherein the step of bonding the pad to the second fabric by permitting flow of the first layer of heat-activated adhesive through the pad includes the sub-steps of:
    positioning the heated laminate composite between an upper mold and a lower mold; and
    compressing the laminate composite with the upper mold and the lower mold.

3. The method of claim 2, wherein the step of compressing the laminate composite with the upper mold and the lower mold includes the step of maintaining the upper and lower molds at approximately room temperature.

4. The method of claim 2, wherein the step of compressing the laminate composite with the upper mold and the lower mold comprises the step of applying pressure to the heated laminate composite of between approximately 1,500 lb/in$^2$ and 2,500 lb/in$^2$.

5. The method of claim 2, wherein the step of compressing the laminate composite with the upper mold and the lower mold includes the step of maintaining at least one of the upper and lower molds at a temperature of at least 150° F.

6. The method of claim 1, wherein the step of heating the laminate composite includes the step of maintaining the laminate composite under substantially atmospheric pressure.

7. The method as set forth in claim 1, further comprising the steps of compressing the first fabric layer, pad and first layer of heat-activated adhesive until a bond is effectuated between the first fabric layer and the pad.

8. The method as set forth in claim 1, further including the step of applying dielectric heat to the laminate composite.

9. The method of claim 1, wherein the step of heating the laminate composite the produce a heated laminate composite comprises the step of slowly heating the laminate composite to a temperature of at least 250° F.

10. A method of manufacturing a prebonded composite structure, the method comprising the steps of:
preparing a laminate composite, the step of preparing a laminate composite including the sub-steps of:
  i) positioning a first layer of heat-activated adhesive between a first fabric layer and a first side of a pad; and
  ii) positioning a second fabric layer adjacent a second side of the pad;
heating the laminate composite to produce a heated laminated composite;
positioning the heated laminate composite between an upper mold and a lower mold; and
compressing the first layer of heat-activated adhesive between the pad and the first fabric layer with the upper mold and the lower mold, the step of compressing the first layer of heat-activated adhesive between the pad and the first fabric layer comprising the steps of:
bonding the pad to the first fabric layer; and
bonding the pad to the second fabric layer by permitting flow of the first layer of heat-activated adhesive through the pad.

11. The method as set forth in claim 10, wherein the step of heating the laminate composite includes the step of maintaining the laminate composite under substantially atmospheric pressure.

12. The method as set forth in claim 11 wherein the step of compressing the first layer of heat-activated adhesive between the pad and the first fabric layer includes the step of maintaining the upper and lower molds at approximately room temperature.

13. The method as set forth in claim 10, wherein the step of compressing the first layer of heat-activated adhesive between the first fabric layer and pad comprises the step of applying a pressure of between approximately 1,500 lb/in$^2$ and 2,500 lb/in$^2$.

14. The method as set forth in claim 10, further comprising the step of maintaining the first fabric layer, pad and first layer of heat-activated adhesive in a compressed condition until a bond is effectuated between the first fabric layer and the pad.

15. The method as set forth in claim 10, further including the step of applying dielectric heat to the laminate composite.

16. The method as set forth in claim 15, wherein the dielectric heat applied to the laminate composite is a low energy level dielectric heat.

17. The method as set forth in claim 16, wherein the step of compressing the laminate composite between the upper and lower molds includes the step of maintaining at least one of the upper and lower molds at a temperature of at least 150° F.

* * * * *